United States Patent
Miyamura et al.

(10) Patent No.: US 7,110,208 B1
(45) Date of Patent: Sep. 19, 2006

(54) METHOD FOR IMPROVING SERVO PERFORMANCE IN A DISK DRIVE HAVING TRACKS WITH MINI SERVO WEDGES

(75) Inventors: Masao Miyamura, Diamond Bar, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 258 days.

(21) Appl. No.: 10/903,524

(22) Filed: Jul. 30, 2004

(51) Int. Cl.
*G11B 5/596* (2006.01)
*G11B 5/09* (2006.01)
(52) U.S. Cl. ............ 360/77.08; 360/48
(58) Field of Classification Search ............ None
See application file for complete search history.

(56) References Cited

U.S. PATENT DOCUMENTS

| | | | |
|---|---|---|---|
| 4,656,538 A | 4/1987 | Mattson | |
| 5,526,202 A * | 6/1996 | Blagaila et al. | 360/77.08 |
| 5,784,219 A | 7/1998 | Genheimer | |
| 6,108,150 A * | 8/2000 | Lee | 360/48 |
| 6,388,829 B1 | 5/2002 | Nazarian | |
| 6,556,365 B1 | 4/2003 | Satoh | |
| 6,992,854 B1 * | 1/2006 | Gostling | 360/77.08 |
| 2003/0035239 A1 * | 2/2003 | Ottesen et al. | 360/78.06 |

* cited by examiner

*Primary Examiner*—Andrew L. Sniezek
(74) *Attorney, Agent, or Firm*—Robroy R. Fawcett, Esq.

(57) ABSTRACT

A method is disclosed for improving servo performance in a disk drive having a plurality of concentric tracks. Each track has a plurality of first-type servo sectors and a plurality of second-type servo sectors. In the method, track identification information and track position information are read from a first-type servo sector. A track number and a transducer position are estimated for a second-type servo sector. Track position information is read from the immediately following second-type servo sector. An odd/even property from the second-type servo sector is compared with an odd/even property for the estimated track number. The odd/even property of the estimated track number is conditionally adjusted such that the odd/even property of the estimated track number matches the odd/even property from the second-type servo sector. A position error signal is determined using the adjusted track number and the track position information read from the second-type servo sector.

16 Claims, 6 Drawing Sheets

METHOD FOR IMPROVING SERVO PERFORMANCE IN A DISK DRIVE HAVING TRACKS WITH MINI SERVO WEDGES

BACKGROUND OF THE INVENTION

1. Field of the Invention

The present invention relates to disk drives, and more particularly, to a technique for improving servo performance in a disk drive having tracks at least partially defined by "mini" servo wedges that do not have a track number field.

2. Description of the Prior Art and Related Information

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the likelihood that an external vibration or shock may undesirably force the disk drive's read/write head over an adjacent track during track following.

Accordingly, there exists a need for a method that improves the servo performance of a disk drive without unnecessarily impacting the disk drive's storage capacity or increasing the disk drive's manufacturing cost.

SUMMARY OF THE INVENTION

The present invention may be embodied in a method for improving servo performance in a disk drive having a transducer and a disk with a plurality of concentric tracks each identified by a track number. Each track has a plurality of first-type servo sectors providing track identification information for determining a track's number and providing track position information for determining a position error signal between the transducer's position and a reference position. Each track also has a plurality of second-type servo sectors providing track position information including an odd/even property for the track's number but not providing track identification information for determining the track's number. The second-type servo sectors are interspersed between the first-type servo sectors such that each first-type servo sector is separated from another first-type servo sector by at least one second-type servo sector. The servo sectors are separated by respective data regions. In the method, track identification information and track position information are read from a first-type servo sector. A track number and a transducer position are estimated for a second-type servo sector immediately following the first-type servo sector. Track position information is read from the immediately following second-type servo sector. The odd/even property from the immediately following second-type servo sector is compared with an odd/even property for the estimated track number. If the odd/even property from the second-type servo sector does not match the odd/even property of the estimated track number, then the odd/even property of the estimated track number is adjusted by changing the track number by one track number such that the odd/even property of the estimated track number matches the odd/even property from the second-type servo sector. A position error signal between the transducer's position and a reference position is determined using the adjusted track number and the track position information read from the immediately following second-type servo sector.

In more detailed features of the invention, each first-type servo sector may comprise a track identification field and a burst field, and each second-type servo sector may consist of a burst field. The track identification field may provide the track identification information, and the burst field may provide the track position information. Each servo burst field may comprise four servo bursts.

In other more detailed features of the invention, the track number may be adjusted by incrementing or decrementing the track number by one track number based on a comparison between the estimated transducer position and a read transducer position determined from the read track position information of the second-type servo sector. More particularly, the track number may decremented by one track number if the read transducer position is greater than the estimated transducer position. Similarly, the wherein the track number may be incremented by one track number if the read transducer position is less than or equal to the estimated transducer position.

The present invention also may be embodied in a disk drive having a servo control system and a disk with a plurality of concentric tracks. Each track includes a first-type servo sector and a second-type servo sector. The first-type servo sector provides track identification information for determining a track's number and providing track position information for determining a position error signal between a transducer's position and a reference position, and the second-type servo sector provides track position information including an odd/even property for the track's number but does not provide track identification information for determining the track's number. The second-type servo sector immediately follows the first-type servo sector. A first data region is disposed between the first-type servo sector and the second-type servo sector. The servo control system reads track identification information and track position information from a first-type servo sector, estimates a track number and transducer position for the second-type servo sector, reads track position information from the second-type servo sector, and then compares the odd/even property from the second-type servo sector with an odd/even property for the estimated track number. The servo control system then determines a position error signal using the adjusted track number and the track position information read from the second-type servo sector.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
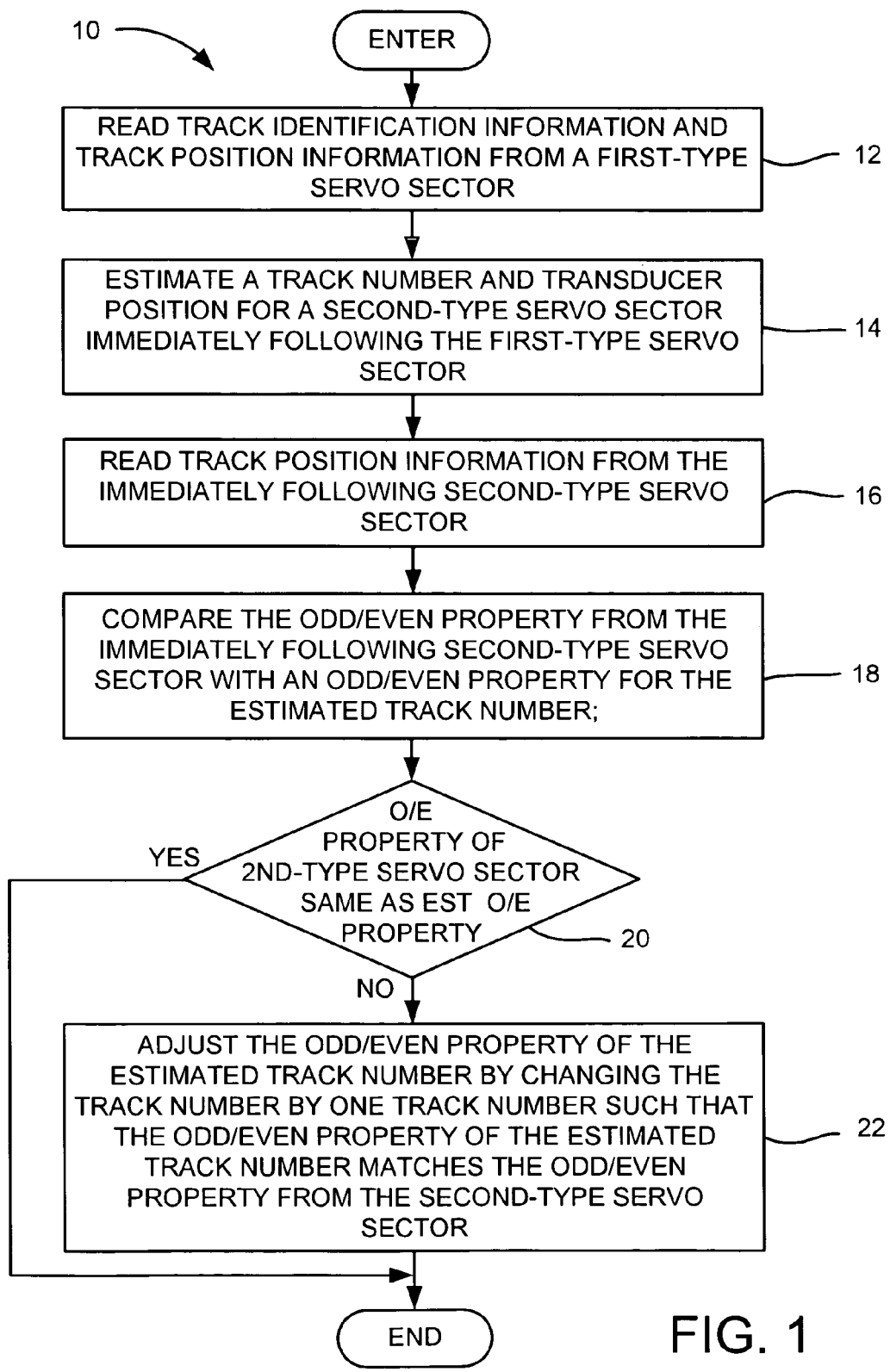
FIG. 1 is a flow diagram illustrating a method for improving servo performance in a disk drive using mini-wedges, according to the present invention.
Figure 2:
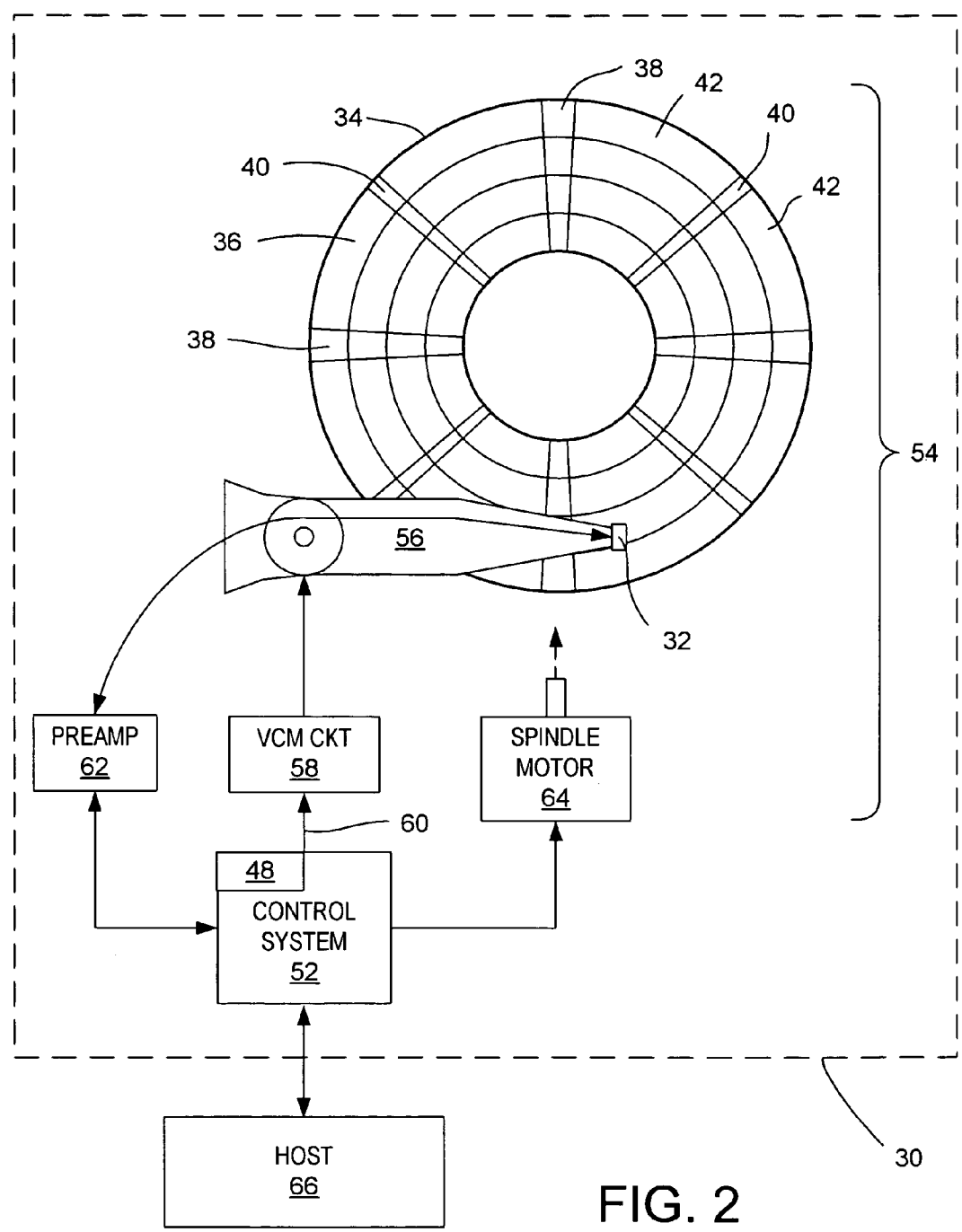
FIG. 2 is a block diagram of a disk drive having improved servo performance by implementing the method of FIG. 1.

With reference to FIGS. 1 and, the present invention may be embodied in a method 10 (FIG. 1) for improving servo performance in a disk drive 30 (FIG. 2). The disk drive has a transducer 32 and a disk 34 with a plurality of concentric tracks 36 each identified by a track number. Each track has a plurality of first-type servo sectors 38 providing track identification information for determining a track's number and providing track position information for determining a position error signal (PES) between the transducer's position and a reference position. Each track also has a plurality of second-type servo sectors 40 providing track position information including an odd/even property for the track's number but not providing track identification information for determining the track's number. The second-type servo sectors are interspersed between the first-type servo sectors such that each first-type servo sector is separated from another first-type servo sector by at least one second-type servo sector. The servo sectors are separated by respective data regions 42. In the method, track identification information and track position information are read from a first-type servo sector (step 12). A track number and a transducer position are estimated for a second-type servo sector immediately following the first-type servo sector (step 14). Track position information is then read from the immediately following second-type servo sector (step 16). The odd/even property from the immediately following second-type servo sector is compared with an odd/even property for the estimated track number (step 18). If the odd/even property from the second-type servo sector does not match the odd/even property of the estimated track number (step 20), then the odd/even property of the estimated track number is adjusted by changing the track number by one track number such that the odd/even property of the estimated track number matches the odd/even property from the second-type servo sector (step 22). A position error signal between the transducer's position and a reference position is determined using the adjusted track number and the track position information read from the immediately following second-type servo sector (step 24).

The present invention permits the use of a higher number of servo wedges (formed by a radial alignment of the servo sectors 38 and 40) with a directly proportional increase in the disk surface area dedicated to the servo wedges. The higher number of servo wedges provides a higher position sampling rate allowing increased track density (i.e., TPI) and better shock and vibration operational performance.

Figure 3:
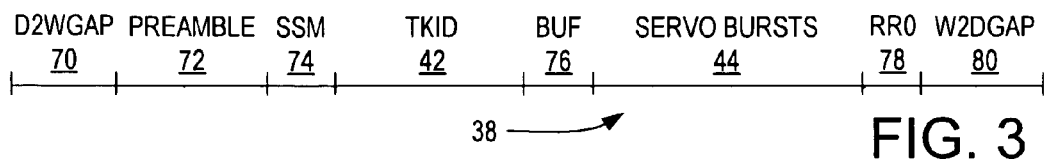
FIG. 3 is a data structure of a typical servo sector providing track identification information for determining a track's number, and providing track position information for determining a position error signal (PES).
Figure 4:
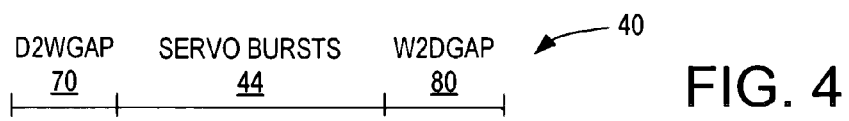
FIG. 4 is a data structure of an embodiment of a mini-wedge servo sector for providing track position information including an odd/even property for the track's number.

With reference to FIGS. 3 and 4, each first-type servo sector 38 (FIG. 3) may comprise a track identification TKID field 42 and a servo burst field 44, and each second-type servo sector 40 may consist of a servo burst field 44. The TKID field may provide the track identification information, and the servo burst field may provide the track position information. Each servo burst field may comprise four servo bursts, described below.

Advantageously, the track number may be adjusted by incrementing or decrementing the track number by one track number based on a comparison between the estimated transducer position and a read transducer position determined from the read track position information of the second-type servo sector 40. More particularly, the track number may be decremented by one track number if the read transducer position is greater than the estimated transducer position. Similarly, the track number may be incremented by one track number if the read transducer position is less than or equal to the estimated transducer position.

The present invention also may be embodied in a disk drive 30 having a servo control system 48 for controlling a transducer's position over the disk 34. The servo control system reads track identification information and track position information from a first-type servo sector 38, estimates a track number and transducer position for the second-type servo sector 40, reads track position information from the second-type servo sector, and then compares the odd/even property from the second-type servo sector with the odd/even property for the estimated track number. The servo control system then determines a position error signal using the adjusted track number and the track position information read from the second-type servo sector.

The disk drive 30 generally comprises a disk control system 52 and a head disk assembly (HDA) 54. The HDA includes the magnetic disk 34 having the plurality of concentric data tracks 36 recorded thereon, the head or transducer 32 for writing user data to or reading user data from a selected one of the data tracks in response to host command, and an actuator 56 for positioning the transducer over the selected track. The transducer 32 in present disk drives comprises a giant magneto-resistive (GMR) read element and thin film inductive write element. The actuator is typically implemented as a voice coil motor (VCM) circuit 58 which rotates an actuator arm about a pivot in order to position the head radially over the disk in response to control signals 60 from the disk control system. The HDA 54 also includes a preamplifier 62, and a spindle motor 64 for rotating the disk. The head communicates with the disk control system 52 via the preamplifier. The disk control system includes the servo control system 48 and also includes circuitry and processors that provide an intelligent disk control system interface between a host 66 and the HDA for execution of read and write commands. The disk control system may have, for example, an internal microprocessor and nonvolatile memory. Program code for implementing the techniques of the invention may be stored in the nonvolatile memory and transferred to volatile random access memory (RAM) for execution by the microprocessor.

The servo control system 48 implements a servo control loop which causes the transducer 32 to follow a desired path (or centerline) of the selected track 36 in an operation generally referred to as "track following." During track following, the path of the head wanders about the desired track path. Typically, the servo control system attempts to limit the head wander to within a predetermined range defined by a "Track Misregistration" (TMR) budget.

A track 34 is selected for track following by applying the reference position corresponding to the selected track at an input of the servo control loop. The position error signal (PES) is generated based on the difference between the reference position and the actual transducer position, which is measured as the transducer 32 passes over a servo sector, 38 or 40, of the selected track. Nominally, a track following compensator of the servo control system 48 processes the PES and generates the control signal 60 for application to the HDA 54.

The servo sectors, 38 or 40, form respective servo wedges across the disk surface. A first-type servo sector may be referred to as a "full-wedge" servo sector, and a second-type servo sector may be referred to as a "mini-wedge" servo sector. FIG. 3 conceptually presents the servo information that may be written in a first-type servo sector 38, but the relative dimensions of the component fields are not drawn to scale. As shown, each first-type servo sector contains a sequence of fields having various functions relative to locating and reading the servo information and implementing the servo control process. More particularly, each first-type servo sector 38 generally comprises a header region (not separately identified) followed by a servo burst field 44.

The header region fields include a data-to-wedge gap (D2WGAP) (or write splice) field 70, a preample field 72 (often having an address mark field and an automatic gain control/phase locked oscillator field), a servo sync mark (SSM) field 74, the track identification (TKID) field 42, a buffer (BUF) field 76. The header region is followed by servo bursts, e.g. A,B,C, and D, that are circumferentially sequential and radially offset relative to a burst pair centerline. After the servo field 44 is an RRO field 78, and a wedge-to-data gap (W2DGAP) field 80. The RRO field of the first-type servo sector 38 of the present invention may be larger than the RRO field of a typical full-wedge servo sector because the RRO field may store the RRO information for both the first-type servo sector and the second-type servo sector 40.

The data-to-wedge gap D2WGAP field 70 provides a buffer zone to prevent the servo control system 48 from interpreting an erasure within a preceding user data segment as an address mark field. The preamble field 72 provides a stable reference to set the gain of a read channel and "train" a phase lock oscillator to lock on the servo channel frequency. The servo sync mark SSM field 74 provides a unique coded word which synchronizes decoding logic in the disk drive's read channel (not shown) to either byte or word timing boundaries. The track identification TKID field 42 provides a binary coded track address that uniquely identifies an integer servo track position for coarsely moving the head to a desired servo track ("seeking"). The TKID field conventionally uses a gray code to allow for reading track identification fields while sweeping across multiple servo tracks during seek operations. The buffer field 76 provides space between the TKID field 42 and the servo burst field 44. Lastly, the plurality of circumferentially sequential, radially offset servo bursts (e.g. "A", "B" and "C", "D") provide the servo control system with information needed to determine a fractional track position for keeping the transducer at a desired position relative to the servo centerline ("track following").

Figure 6:
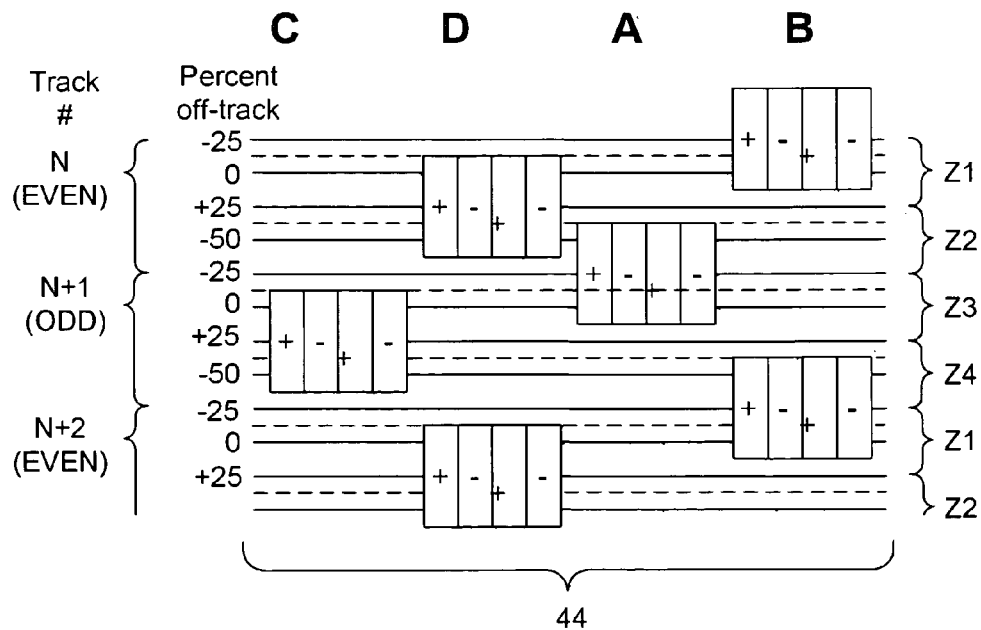
FIG. 6 is a schematic diagram of servo burst patterns for providing track position information including an odd/even property for the track's number.

More particularly, the four servo bursts "A", "B", "C", and "D" are arranged in a quadrature pattern as shown in FIG. 6. Regarding the designation of bursts as "A", "B", "C", "D" etc., the burst designation and the order of such designated bursts laid down on the disk is arbitrary and may vary from manufacturer to manufacturer. The track centerlines are defined relative to burst pairs. In particular, the "B" and "D" bursts define track centerlines that are associated with even track numbers, and the "C" and "A" bursts define track centerlines that are associated with even track numbers.

Figure 5:
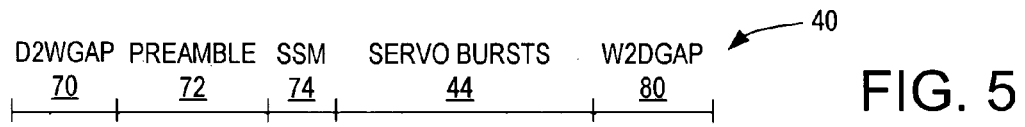
FIG. 5 is a data structure of another embodiment of a mini-wedge servo sector for providing track position information including an odd/even property for the track's number.

FIG. 4 presents the servo information for an embodiment of a second-type servo sector 40. The servo sector may have only the four quadrature servo bursts 44. The four servo bursts define two track centerlines and thus provide an odd/even property for a track's number. Advantageously, the four servo bursts are accompanied by a D2WGAP field 70 and a W2DGAP field 80. In an alternative embodiment, shown in FIG. 5, a second-type servo sector 40 may further include a preamble field 72 and/or a servo sync mark SSM field 74 to enhance the readability of the servo bursts 44. The second-type servo sector will always lack a track identification TKID field 42 that provides information for determining the track's number.

Figure 7:
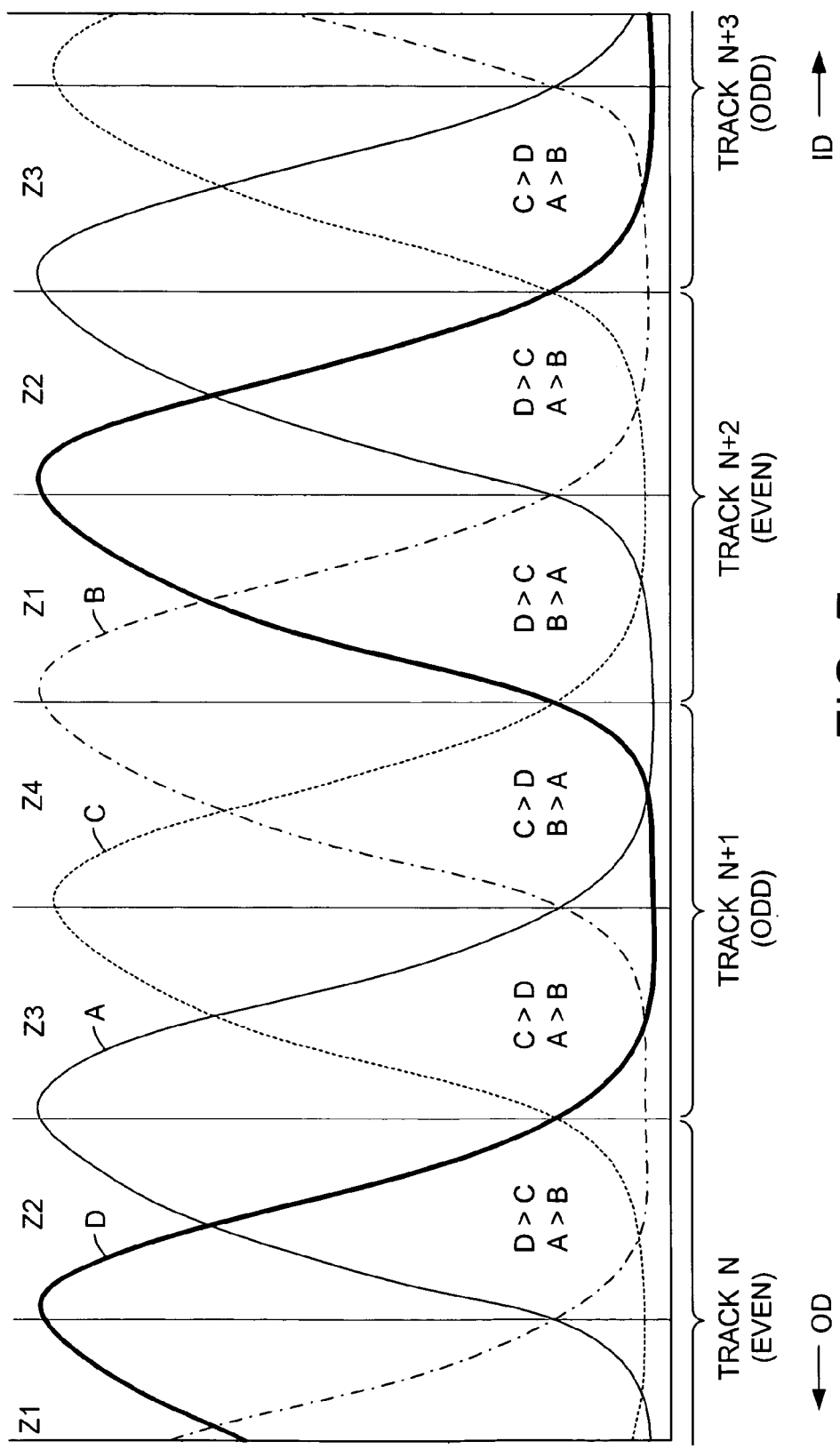
FIG. 7 is a graph of servo burst amplitudes versus position.

FIG. 7 shows the amplitude of a signal read from each servo burst, as the transducer passes through the servo burst field 44, with respect to radial position. The first burst read is the "C" burst, then the "D" burst, then the "A" burst, and lastly, the "B" burst. Generally, track numbering begins at the disk's outer diameter (OD) and ends at the disk's inner diameter (ID). For this discussion, a track number N is assumed to have an even value. Advantageously, each track may have two position zones, an on-track position zone and an off-track position zone. For an even number track, the on-track position zone may be designated as a first zone Z1, and the off-track zone may be designated as a second zone Z2. For an odd numbered track, the on-track position zone may be designated as a third zone Z3, and the off-track position zone may be designated as a fourth zone Z4.

The position zone may be determined by comparing the amplitudes measured for the "A" and "B" bursts, and by comparing the amplitudes measured for the "C" and "D" bursts. The transducer's position is in the first zone Z1 if B>A and D>C. The transducer's position is in the second zone Z2 if D>C and A>B. The transducer's position is in the third zone Z3 if A>B and C>D. The transducer's position is in the fourth zone Z4 if C>D and B>A. Once the zone has been determined, an odd/even property of the track number may be determined. More particularly, the track number should be even if the transducer's position is in either of the first and second zones, Z1 and Z2, and should be odd if the transducer's position is in either of the third and fourth zones, Z3 and Z4. If the odd/even property for the estimated track number of a second-type servo sector 40 does not match the odd/even property for the position zone, then the estimated track number is adjusted by changing the track number by one track number, according to the present invention. For example, if the estimated track number is odd (i.e., N+1) and the transducer's position is in either of the even zones (the first or second zones Z1 and Z2), then the track number is adjusted to an even track number (i.e., N or N+2). The direction of the track number adjustment may be determined by a "fine" transducer position.

Figure 8:
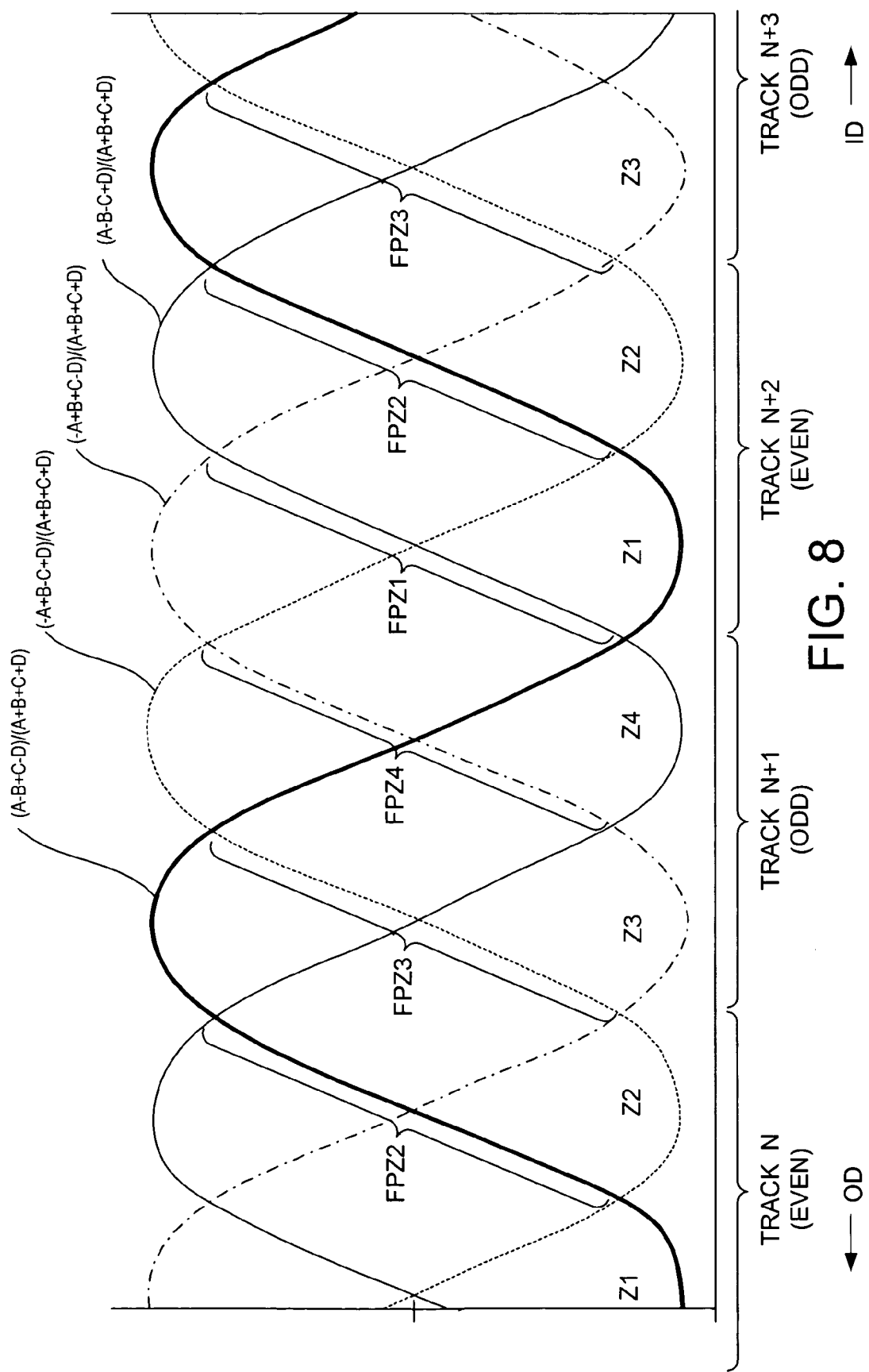
FIG. 8 is a graph of calculated burst ratio versus track position for determining a fine transducer position and an odd/even property, according to the present invention.

With reference to FIG. 8, the fine transducer position FP is determined by combining the burst amplitudes and using a relatively linear portion of the resulting burst ratio curves. For example, in the first zone Z1, the burst amplitudes are combined according to the equation $(A-B-C+D)/(A+B+C+D)$. In the second zone Z2, the equation is $(A-B+C-D)/(A+B+C+D)$. Similarly, in the third zone Z3, the equation is $(-A+B-C+D)/(A+B+C+D)$. Finally, in the fourth zone Z4, the equation is $(-A+B+C-D)/(A+B+C+D)$. The fine transducer position within each zone may be determined by multiplying the burst ratio by a burst normalization and equalization factor. The fine transducer position for an off-track position zone may be shifted by adding a shift factor to the position to provide a continuous position count range for a track. For example, if the fine transducer position for the first zone Z1 (on-track position zone) extends from −64 to +64, the fine transducer position obtained for the second zone Z2 (off-track position zone) may be shifted by +128 to extend from +64 to +192. Thus, the corresponding track's fine transducer position would extend from −64 to +192.

Advantageously, when adjusting the track number, if the fine transducer position determined from the servo bursts 44 is greater than the estimated transducer position, then the track number is decremented by one track number. Similarly, if the fine transducer position determined from the servo bursts is less than the estimated transducer position, then the track number is incremented by one track number. Thus, the track number for the track that is closest to the estimated transducer position may be selected.

Figure 9:
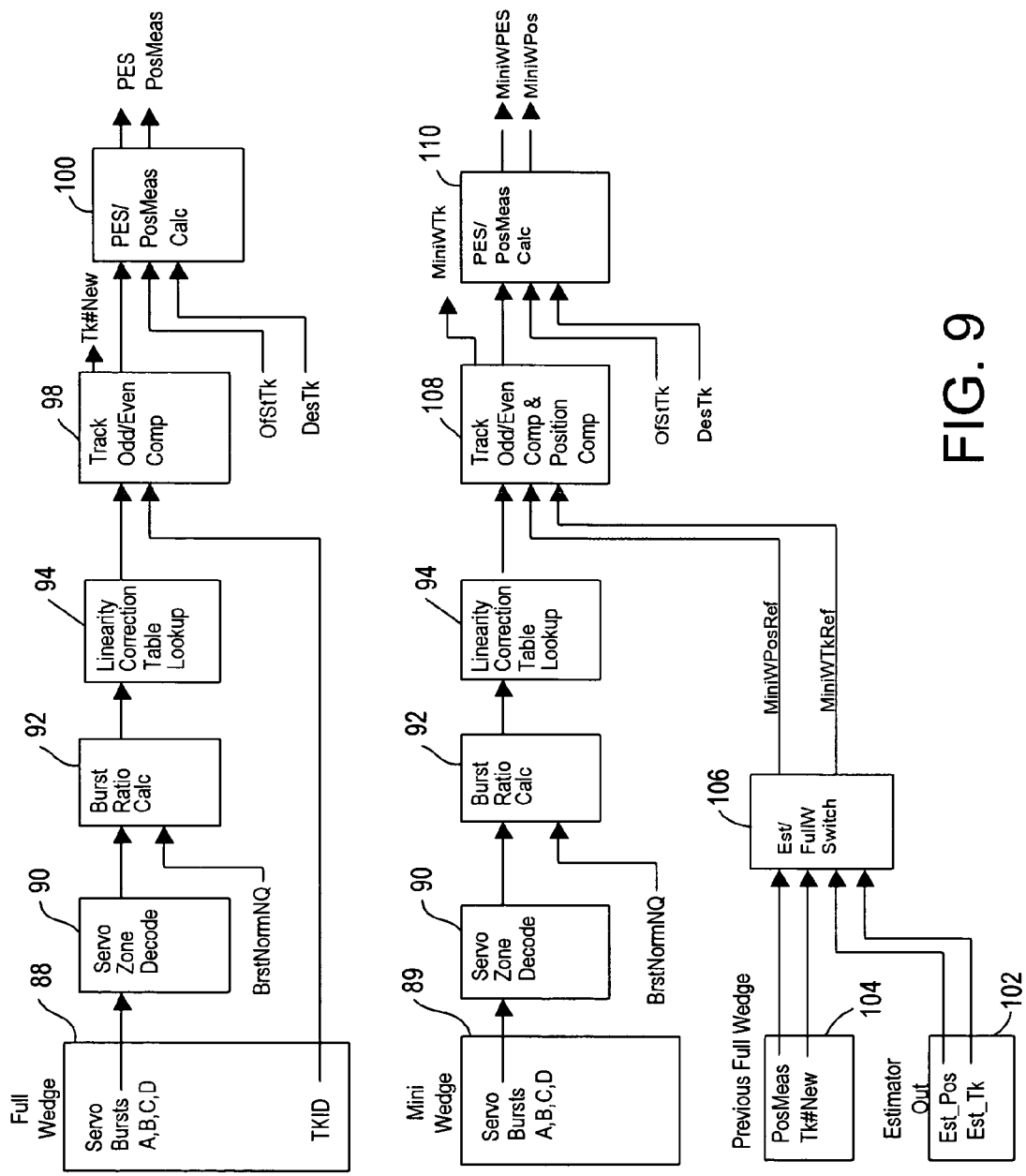
FIG. 9 is a block diagram showing a technique for processing full-wedge servo sectors and mini-wedge servo sectors.

The processing of the first-type and second-type servo sectors may be described in more detail with respect to FIG. 9. A first-type (full wedge) servo sector 38 is encountered and the TKID and servo bursts are read (block 88). The servo zone is decoded (block 90) and the burst ratio is calculated (block 92). Burst normalization and equalization factors BrstNomNQ may be used in calculating the burst ratio. A linearity correction may be applied to the fine transducer position using a lookup table (block 94). The odd/even property for the track number determined from the track ID is compared with the servo zone odd/even property, and then, if necessary, the track number is adjusted Tk#New (block 98). The PES and measured transducer position is calculated from the fine transducer position, the designated track DesTk, and the track offset OfStTk (block 100). The track offset is applied to the PES to allow track following away from track center and possibly several tracks away from the specified destination. This is primarily for the transducer's writer/reader jog.

A similar process in followed for the second-type (mini-wedge) servo sectors 40. A second-type servo sector is encountered and the servo bursts are read (block 89). However, the transducer position and track number are estimated from the previous first-type servo sector (block 102). Alternatively, the estimated transducer position and track number may be that determined from the previous full wedge servo sector (block 104). The estimated mini-wedge position reference MiniWPosRef and the mini-wedge track number reference MiniWTkRef are selected by a switch (block 106) from an estimator or the previous full wedge, and an odd/even property comparison, and if necessary, a fine position comparison, are performed (block 108). If necessary, the mini-wedge track number is adjusted and then the PES and transducer position calculated for the second-type servo sector (block 110).

As noted above, it is generally desirable to have more servo wedges on a track for enhanced servo performance, shock detection and position control. From empirical data, a disk drive having a disk rotation rate of 7200 rpm may use a typical full-wedge servo sector of 2.236 microseconds in length. Using the typical full-wedge servo sectors, about 4.83% of the disk's magnetic surface is occupied by the servo information. A disk drive 30 of the present invention using the same rotation rate may use a first-type servo sector 38 of 2.418 microseconds, and a second-type servo sector 40 of 1.450 microseconds. Using the first-type and second-type servo sectors and the same sample rate, about 4.18% of the disk magnetic surface is occupied by the servo information. Thus, the servo sample rate may be increased by adding more servo wedges without unduly impacting the disk's surface area dedicated to data storage.

What is claimed is:

1. A method for improving servo performance in a disk drive having a transducer and a disk with a plurality of concentric tracks each identified by a track number, wherein each track has a plurality of first-type servo sectors providing track identification information for determining a track's number and providing track position information for determining a position error signal between the transducer's position and a reference position, and has a plurality of second-type servo sectors providing track position information including an odd/even property for the track's number but not providing track identification information for determining the track's number, the second-type servo sectors being interspersed between the first-type servo sectors such that each first-type servo sector is separated from another first-type servo sector by at least one second-type servo sector, and wherein the servo sectors are separated by respective data regions, the method comprising:

reading track identification information and track position information from a first-type servo sector;

estimating a track number and a transducer position for a second-type servo sector immediately following the first-type servo sector;

reading track position information from the immediately following second-type servo sector;

comparing the odd/even property from the immediately following second-type servo sector with an odd/even property for the estimated track number;

if the odd/even property from the second-type servo sector does not match the odd/even property of the estimated track number, then adjusting the odd/even property of the estimated track number by changing the track number by one track number such that the odd/even property of the estimated track number matches the odd/even property from the second-type servo sector; and determining a position error signal between the transducer's position and a reference position using the adjusted track number and the track position information read from the immediately following second-type servo sector.

2. A method for improving servo performance as defined in claim 1, wherein each first-type servo sector comprises a track identification field and a burst field, and each second-type servo sector consists of a burst field.

3. A method for improving servo performance as defined in claim 2, wherein the track identification field provides the track identification information, and the burst field provides the track position information.

4. A method for improving servo performance as defined in claim 2, wherein each servo burst field comprises four servo bursts.

5. A method for improving servo performance as defined in claim 1, wherein the track number is adjusted by incrementing or decrementing the track number by one track number based on a comparison between the estimated transducer position and a read transducer position determined from the read track position information of the second-type servo sector.

6. A method for improving servo performance as defined in claim 5, wherein the track number is adjusted by selecting track closest to the estimated transducer position.

7. A method for improving servo performance as defined in claim 5, wherein the track number is decremented by one track number if the read transducer position is greater than the estimated transducer position.

8. A method for improving servo performance as defined in claim 5, wherein the wherein the track number is incremented by one track number if the read transducer position is less than or equal to the estimated transducer position.

9. A disk drive comprising:

a disk with a plurality of concentric tracks, each track including:

a first-type servo sector providing track identification information for determining a track's number and providing track position information for determining a position error signal between a transducer's position and a reference position, a second-type servo sector providing track position information including an odd/even property for the track's number but not providing track identification information for determining the track's number, the second-type servo sector immediately following the first-type servo sector; and a first data region disposed between the first-type servo sector and the second-type servo sector; and a servo control system for reading track identification information and track position information from a first-type servo sector, estimating a track number and a transducer position for the second-type servo sector, reading track position information from the second-type servo sector, comparing the odd/even property from the second-type servo sector with an odd/even property for the estimated track number, and determining a position error signal between the transducer's position and a reference position using the adjusted track number and the track position information read from the second-type servo sector.

10. A disk drive as defined in claim 9, wherein each first-type servo sector comprises a track identification field and a burst field, and each second-type servo sector consists of a burst field.

11. A disk drive as defined in claim 10, wherein the track identification field provides the track identification information, and the burst field provides the track position information.

12. A disk drive as defined in claim 10, wherein each servo burst field comprises four servo bursts.

13. A disk drive as defined in claim 9, wherein the servo control system adjusts the track number by incrementing or decrementing the track number by one track number based on a comparison between the estimated transducer position and a read transducer position determined from the read track position information of the second-type servo sector.

14. A disk drive having as defined in claim 13, wherein the servo control system adjusts the track number by selecting track closest to the estimated transducer position.

15. A disk drive having as defined in claim 13, wherein the servo control system decrements the track number by one track number if the read transducer position is greater than the estimated transducer position.

16. A disk drive as defined in claim 13, wherein the servo control system increments the track number by one track number if the read transducer position is less than or equal to the estimated transducer position.

* * * * *